May 16, 1961 W. E. TITTERTON ET AL 2,983,961
BLOW MOLDING OF POLYTETRAFLUOROETHYLENE
Filed Jan. 30, 1957
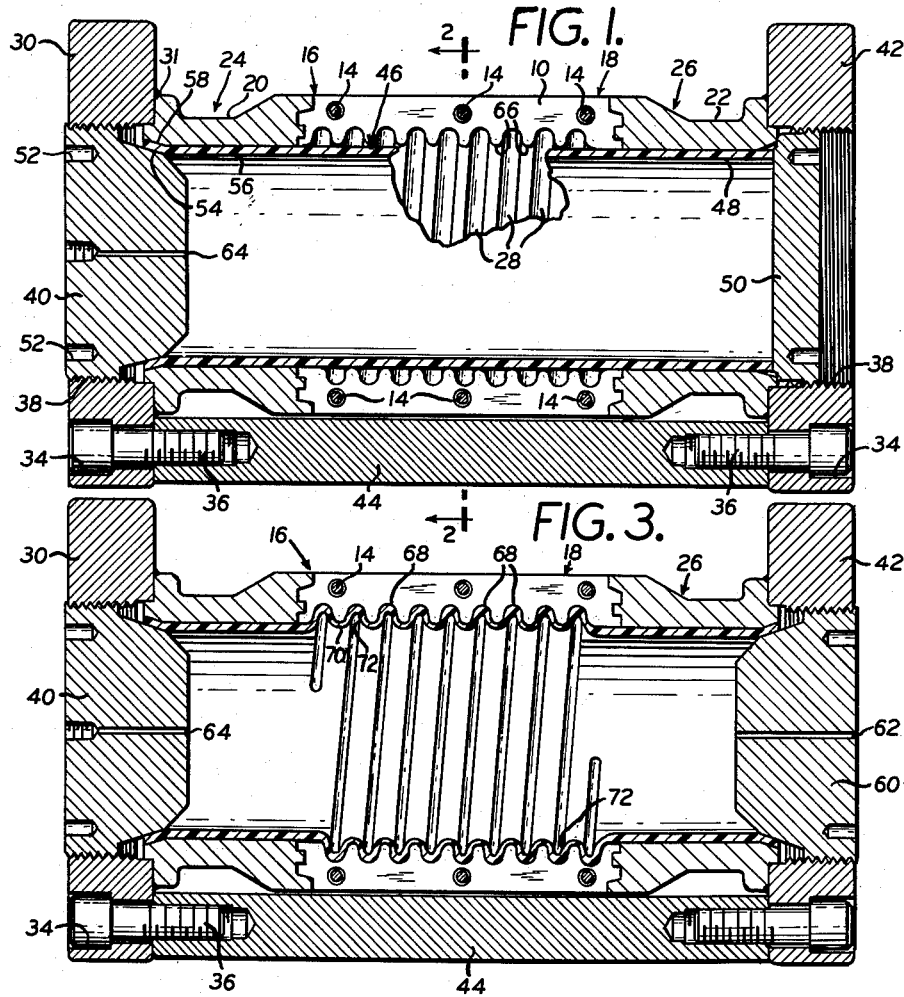
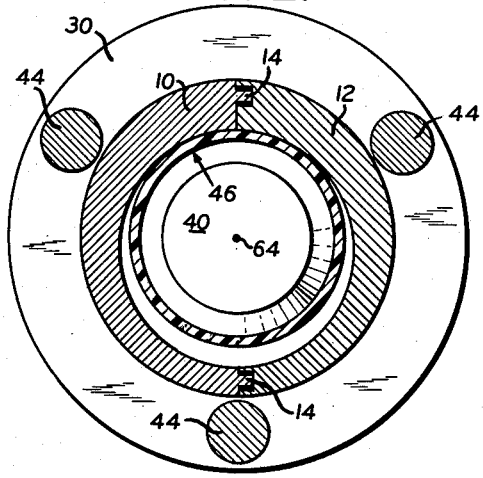
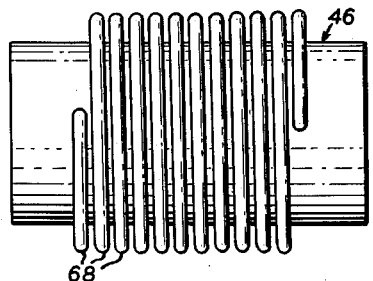
INVENTORS
WILLIAM E. TITTERTON
FRANK KAMP
BY Churchill, Weymouth & Engel
ATTORNEYS.

2,983,961
BLOW MOLDING OF POLYTETRAFLUORO-ETHYLENE

William E. Titterton, Whippany, and Frank Kamp, Little Falls, N.J., assignors to Resistoflex Corporation, Roseland, N.J., a corporation of New York Filed Jan. 30, 1957, Ser. No. 637,158

7 Claims. (Cl. 18—56)

The present invention relates to processes for fabricating articles from polytetrafluoroethylene resin.

Polytetrafluoroethylene (hereinafter abbreviated P.T.F.E.) resin, more commonly known as "Teflon," the trademark of its present supplier, has been called a thermoplastic by some, while many others contend that it is not. Actually, it has an extremely high viscosity at what might be termed the melting point and becomes a gel which can be handled as a semi-solid. It clearly is not a thermosetting resin because it forms a gel upon reheating. On the other hand it can not be molded by ordinary plastics processes, but, rather, must be molded by methods common to powder metallurgy or ceramics. The only safe conclusion is that it is an individualistic or new member of the plastics family and is quite different from any other substance now known. In fact, there is a marked difference between it and some of its closest chemical neighbors such as trichlorofluoroethylene ("Kel-F").

Because of the unique chemical properties of P.T.F.E. there has arisen a great demand for articles of diverse nature formed from it. A typical example is the desire and need for a flexible tubular bellows which could be used as an expansion joint or flexible coupling between conduits formed from P.T.F.E. or other materials. Such elements have, in fact, been manufactured, but by machining from heavy walled tubular stock or from solid rod. Naturally, this involves costly operations and a considerable waste of material and does not lead to an economical item.

In accordance with the present invention it has been discovered that flexible bellows or similar articles can be formed from P.T.F.E. by selecting the proper starting material and blow molding in special apparatus under special conditions. It has also been discovered that bellows can be formed from tubes which are more flexible than would normally be expected from the accordion-pleating of a section of the tube. Thus, a bellows can be formed of P.T.F.E. having grooves and interconnecting sidewalls which are substantially thinner than the adjacent lands and integral tubular ends. In this manner, the thinned walls increase the flexibility of the unit and improve its performance and life.

More specifically it has been discovered that a sintered tube of P.T.F.E., which has been prepared by extruding a paste-like mixture of the resin and a suitable extrusion aid, can be post-formed by blow molding. It has been found, however, that for maximum flex life of the finished product two things are essential. First, the paste extruded tube must be rapidly quenched, preferably by immersion in a water bath, after being sintered. Second, the tube must be quench cooled after it is post-formed, as will be explained more fully hereinafter.

Therefore, the method of blow molding articles from P.T.F.E. in accordance with a preferred embodiment of the present invention comprises placing a rapidly quenched sintered tube of paste extruded P.T.F.E. in a mold whose molding cavities are restricted to an intermediate portion of the tube, affixing plugs to the ends of the tube for supplying an inert blowing medium under pressure and preferably pressurized air to the interior thereof, heating the tube along the intermediate portion while maintaining the ends thereof at a lower temperature until the intermediate portion is close to but below the gel point of the resin, supplying the pressurized air to the interior of the tube at a pressure generally in excess of 25 p.s.i. and sufficient to expand the intermediate portion thereof into the mold cavities without causing rupture thereof, rapidly quenching the tube while maintaining the internal pressure, and releasing the pressure and removing the molded tube from the mold. Under certain circumstances it is desirable to maintain a slight pressure within the tube during the time it is being heated.

An important point to note in connection with the blow molding of P.T.F.E. is that the forming pressure is relatively high and considerably higher than that required for the bolw molding of conventional thermoplastics of comparable wall thickness. In fact, the pressure required for forming satisfactorily a given tube of P.T.F.E. is only slightly below that which might rupture the walls of such tube. This fact is the basis in the preferred embodiment of the invention for maintaining the ends of the tubes at a lower temperature than the central portion which is being formed. By restraining the temperature of the ends the possibility of leaks developing around the end plugs during blowing is precluded.

The invention will be understood better after reading the following detailed description with reference to the accompanying drawings in which:

Fig. 1 is a longitudinal sectional view of a mold with a tube of paste extruded P.T.F.E. showing an intermediate step in the assembly thereof, all in accordance with the present invention, Fig. 2 is a cross-sectional view taken along line 2—2 in Fig. 1, Fig. 3 is a longitudinal sectional view similar to Fig. 1 showing the fully assembled mold after the tube has been molded, and Fig. 4 is an elevational view of a completed flexible bellows constructed in accordance with the invention.

A typical mold suitable for blow molding lengths of P.T.F.E. tubing is shown in Figures 1, 2 and 3. The molding zone occupying the intermediate section of the mold is formed by the half sections 10 and 12 provided by splitting the intermediate section longitudinally down its middle. The half sections are located with respect to one another by the locating pins 14 and are secured together by interlocking at 16 and 18 with the cylindrical portions 20 and 22 of the end sections 24 and 26, respectively. The half sections 10 and 12 have their interior surfaces contoured with, as shown in the drawing by way of example, a continuous helical groove 28.

The cylindrical portion 20 is joined to a flange 30 by welding at 31, or in any other suitable manner. The flange 30 is provided with a plurality of perforations near its periphery which are countersunk at 34 to receive the bolts 36. The flange 30 is also provided with a central opening threaded at 38 to receive the end plug 40.

The cylindrical portion 22 is joined in like manner to a flange 42 which is identical to flange 30. If the perforations in each flange which bear the countersink are aligned, then the end sections can be united by the tie rods 44 with the aid of the bolts 36. The flanges 30 and 42 are made massive for increasing the thermal lag and thermal radiation of the end sections in order to help maintain the end plugs at a sufficiently reduced temperature for the reason mentioned above.

In order to assemble the mold for use, a length of tubing 46 of quenched sintered paste extruded P.T.F.E. is inserted in the mold with one end 48 engaging or bottomed against the bottoming plug 50 which is initially screwed into the flange 42 as shown in Fig. 1. The plug 50 prevents axial movement of the tube 46, which may have a comparatively heavy wall, as the end plug 40 is screwed home with the aid of a pin type spanner wrench and the wrench sockets 52. As the plug 40 is screwed into the flange 30, the tapered surface 54 crushes and grips the end 56 of the tube 46 against the beveled surface 58 of the cylindrical portion 20.

With one end of the tube 46 secured in the mold, the bottoming plug 50 may be removed and replaced with another end plug 60 as shown in Fig. 3. End plug 60 grips the end 48 of the tube 46 in a manner similar to end plug 40. It will be observed from the drawings that the plug 60 is provided with a passage 62 for venting excessive pressure from the mold such as might be caused by moisture in the air supply. In similar fashion plug 40 has a passage 64, but differs from plug 60 in that it also has a tapped countersunk opening at the external end of passage 64 for receiving a hose fitting or the like whereby air under pressure can be supplied to the interior of the tube 46. Notice should also be taken of the massive nature of plugs 40 and 60 which contributes to the temperature limiting characteristics of the ends of the mold.

With the arrangement completely assembled as shown in Fig. 3 the molding of the tube can now take place. Heat is applied to the intermediate section of the mold by any suitable means. It has been found satisfactory to use an open flame or torch to heat this section but a heating jacket may be used. The temperature is raised until the exterior of the molding zone is at about 600° F. This is roughly 20°–25° below the gel point of the P.T.F.E., there being a difference of opinion as to the exact temperature at which it forms a gel. After a short interval of time at this temperature, it is safe to assume that the portion of the tube 46 within the molding zone is fairly close to 600° F.

Air is now supplied through the passage 64 of end plug 40. The pressure is determined by the initial wall thickness of the tube 46. It has been found that 25–30 p.s.i. is required to form a tube with a 0.022" wall. A 0.060" wall requires about 100 p.s.i. while a 0.100" to 0.130" wall requires about 200 p.s.i. It has been found that the air can and should be admitted fairly rapidly but not instantaneously. Normally the time it takes a man to open the valve in the air line or supply will provide adequate delay. The interior of the tube should attain molding pressure in about 15 to 30 seconds.

If the mold is heated as described above then the central section of the tube 46 will conform to the mold as shown in Fig. 3. Because of the mode of heating, the portions of the tube 46 which are in contact with or overlie the lands 66 of the mold are at a higher temperature then the portions overlying the cavities or grooves 28. Thus, as the pressure is applied the material flows from the hotter portions producing a non-uniform wall thickness in the finished article. Note that the lands 68 of the bellows retain almost the same thickness as the end portions 48 and 56, while the grooves and side walls 70 and 72 are substantially thinner. This results in a marked increase in flexibility. However, it is possible to control the heating so as to produce a more uniform wall thickness, if desired.

With the pressure maintained and the mold still close to the molding temperature the entire assembly is immersed in a water bath. To facilitate this step in the process a P.T.F.E. flexible hose may be used for connecting the air supply to the end plug 40. The hose must withstand the heat communicated to it from the mold. After the quench step the air supply is shut off and the pressure permitted to drop within the mold. The end plugs are then removed and the mold disassembled and the molded tube or bellows removed. The finished article is shown in Fig. 4. The method as described above may result in the end product having localized defects such as material folded over upon itself or actually ruptured. If this should be the case, it will be overcome by maintaining from about 10 to 15% of the final molding pressure within the tube 46 during the entire time the mold is being heated. For example, when working with heavy walled tubing requiring a forming pressure of 200 p.s.i. it has been found satisfactory to maintain a pressure of about 20 to 25 p.s.i. within the tube 46 while its temperature is being raised. It has been theorized that the defects are caused in the first instance by the expansion of air entrapped between the wall of the tube 46 and the wall of the mold while the heat is being applied. The presence of a slight internal pressure will resist the forming of bubbles or blisters in the wall of the tube prior to the application of the pressure required for forming the bellows.

It has been found that a flexible bellows formed as described above has an extremely long flex life, substantial flexibility, and can withstand temperatures in use up to about 500° F. without losing shape.

Although, as an example, the mold has been described as being contoured to form a helical bellows it could be contoured to form other shapes. Concentric rings can be employed for bellows formation if desired. It is also possible to employ a pressure relief valve on the air supply line in which case the vent passage 62 can be omitted and the passage 64 enlarged.

It will be apparent that numerous modifications can be made in the molding apparatus as well as in the process described above and, therefore, it is intended that the foregoing description be treated merely as exemplary of the invention involved.

What we claim is:

1. The method of blow molding articles from polytetrafluoroethylene resin comprising the steps of placing a rapidly quenched sintered tube of paste extruded polytetrafluoroethylene in a mold whose molding cavities are restricted to an intermediate portion of the tube, affixing plugs to the ends of said tube for supplying pressurized air to the interior thereof, heating said tube along said intermediate portion while maintaining the ends thereof at a lower temperature until said intermediate portion is close to but below the gel point of the resin, supplying pressurized air to the interior of the tube in excess of 25 p.s.i. and sufficient to expand the intermediate portion thereof into the mold cavities without causing rupture thereof, rapidly quenching said tube while maintaining the internal pressure, and releasing said pressure and removing the molded tube from the mold.

2. The method according to claim 1, wherein said tube is quenched after the expansion thereof by immersing in a water bath the mold containing the tube under pressure.

3. The method according to claim 1, wherein said tube is heated within the mold until the intermediate portion is at approximately 600° F.

4. The method of blow molding flexible bellows from polytetrafluoroethylene resin comprising the steps of placing a rapidly quenched sintered tube of paste extruded polytetrafluoroethylene in a tubular mold having an intermediate molding zone provided with internal lands and grooves for forming the bellows, and end sections, affixing plugs to the ends of said tube for supplying pressurized air to the interior thereof, applying heat to the exterior of said mold opposite only said intermediate molding zone to heat said tube therein until the portion within the molding zone is close to but below the gel point of the resin with the portions of the tube which are adjacent the lands becoming hotter than the portions opposite the grooves, supplying pressurized air to the interior of the tube in excess of 25 p.s.i. and sufficient to expand the tube into the grooves without causing rupture thereof, the hotter portions necking down in favor of the cooler portions, rapidly quenching said tube while maintaining the internal pressure, and releasing said pressure and removing from the mold the tube having its intermediate portion in the form of a flexible bellows.

5. The method of blow molding flexible bellows from polytetrafluoroethylene resin comprising the steps of placing a rapidly quenched sintered tube of paste extruded polytetrafluoroethylene in a tubular mold having an intermediate molding zone provided with internal lands and grooves for forming the bellows, and end sections, affixing plugs to the ends of said tube for securing the tube ends in opposite end sections of the mold and for supplying pressurized air to the interior of the tube, applying heat to the assembly thus formed so as to heat said tube until the portion within the molding zone is close to but below the gel point of the resin while maintaining the tube ends at a lower temperature, supplying pressurized air to the interior of the tube in excess of 25 p.s.i. and sufficient to expand the tube into the grooves without causing rupture thereof, rapidly quenching said assembly while maintaining the internal pressure, and releasing said pressure and removing from the mold the tube having its intermediate portion in the form of a flexible bellows.

6. The process of forming articles from polytetrafluoroethylene resin comprising the steps of placing a rapidly quenched sintered tube of paste extruded polytetrafluoroethylene in a mold whose molding cavities are restricted to an intermediate portion of the tube, affixing sealing elements to the ends of said tube arranged for supplying a blowing medium under pressure to the interior thereof, heating said tube along said intermediate portion until said intermediate portion is close to but below the gel point of the resin, maintaining a sealing grip on the ends of said tube while supplying the blowing medium to the interior of the tube at a pressure sufficient to expand the intermediate portion thereof into the mold cavities without causing rupture thereof, rapidly quenching said tube while maintaining the internal pressure, and releasing said pressure and removing the molded tube from the mold.

7. The process of forming articles from polytetrafluoroethylene resin which comprises the steps of placing a sintered section of paste extruded polytetrafluoroethylene in a mold, heating said section until the portion thereof to be molded is close to but below the gel point of the resin, blowing the heated portion into the mold cavities with a blowing medium under pressure, rapidly quenching said section while maintaining the blowing pressure, and releasing said pressure and removing the molded section from the mold.

References Cited in the file of this patent

UNITED STATES PATENTS

| | | |
|---|---|---|
| 419,914 | Bingham | Jan. 21, 1890 |
| 1,387,616 | Roberts | Aug. 16, 1921 |
| 2,248,898 | Ross et al. | July 8, 1941 |
| 2,405,245 | Ushakoff | Aug. 6, 1946 |
| 2,622,623 | Michaudet | Dec. 23, 1952 |
| 2,664,593 | Larson | Jan. 5, 1954 |
| 2,710,991 | Squires et al. | June 21, 1955 |
| 2,728,356 | Brinsmade et al. | Dec. 27, 1955 |
| 2,752,321 | Heller | June 26, 1956 |
| 2,752,637 | Walker et al. | July 3, 1956 |
| 2,770,842 | Hahn et al. | Nov. 20, 1956 |
| 2,779,976 | Roberts et al. | Feb. 5, 1957 |
| 2,781,552 | Gray | Feb. 19, 1957 |
| 2,863,174 | Schuman et al. | Dec. 9, 1958 |
| 2,874,412 | Flemming et al. | Feb. 24, 1959 |

OTHER REFERENCES

"Blow Molding" (Bailey), published by "Plastics," April 1945, vol. 2, No. 4, pp. 70, 72, 74, 75.